Figure 1:
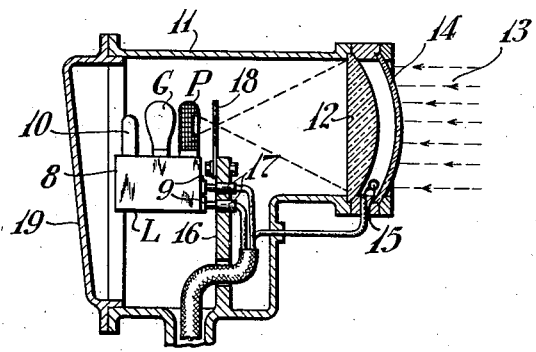

July 9, 1940.   J. W. LOGAN, JR   2,207,097
LIGHT SENSITIVE DEVICE
Filed July 20, 1938

INVENTOR
John W. Logan, Jr.
BY
ATTORNEY

Patented July 9, 1940

2,207,097

UNITED STATES PATENT OFFICE 2,207,097

LIGHT SENSITIVE DEVICE

John W. Logan, Jr., Forest Hills, Pa., assignor to The Union Switch & Signal Company, Swissvale, Pa., a corporation of Pennsylvania Application July 20, 1938, Serial No. 220,278

1 Claim. (Cl. 250—41.5)

My invention relates to light sensitive devices, and has for an object the provision of novel and improved means for improving the operation of devices of the type described.

Control devices of the type comprising a light sensitive unit adapted to be actuated by light rays emitted from a selected source of light have been proposed for controlling yard apparatus in a railway classification yard whereby a railway car interrupting the light rays from the source modifies the control of the yard apparatus. A preferred arrangement for light sensitive controlling devices as applied to railway classification yards is described and covered in United States Letters Patent No. 2,089,835 issued to me on August 10, 1937. In a preferred arrangement of the apparatus described therein, a light sensitive unit is located adjacent the railway tracks and is protected by a housing having a lens capable of collecting and focusing the light rays from the source. I have found that when such housings are exposed to the varying atmospheric conditions, the operating characteristics of light sensitive units may be greatly influenced by moisture present in the atmosphere. One advantage of apparatus embodying my invention is the provision of means effective to prevent the operating characteristics of light sensitive units from being influenced by atmospheric moisture. I have also found that frost and moisture formations upon the lens of the unit housing may decrease the amount of light from the source admitted by the lens. Another advantage of my invention is the provision of means effective to at all times render the lens of the housing capable of admitting the full amount of light received from the source.

Since it is often desirable to install light sensitive units in housings containing other control devices, I have found it desirable to construct light sensitive units in a manner such as to permit an inspection to be made of the control devices within the housing without interfering with the operating conditions of the light sensitive unit housed therein. A further advantage of my invention is the provision of means whereby a light sensitive unit may be retained in an operative condition during the inspection of control elements within said housing. I have also found it desirable to construct light sensitive units in a manner such that each device may be readily removed from the housing so that it may be tested as a unit, and also so that it may be replaced by another unit positioned at the proper point in relation to the focal point of the converging lens. A further advantage of my invention is the provision of novel and improved means whereby light sensitive devices may be handled and tested as units. Other objects and advantages of my invention will appear as the specification progresses.

I shall describe one form of apparatus embodying my invention, and shall then point out the novel features thereof in the claim.

Figure 2:
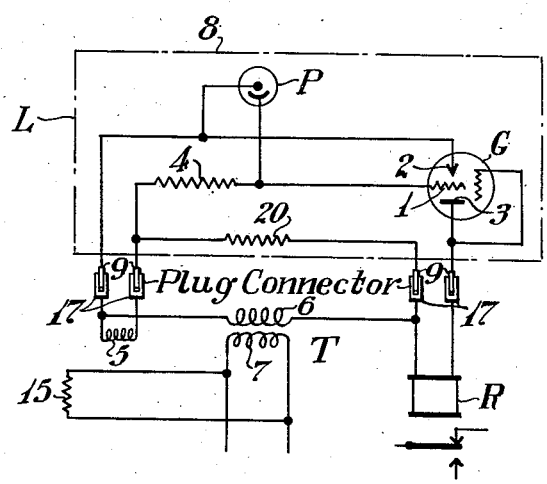

For a better understanding of my invention, reference may be had to the accompanying drawing, of which Fig. 1 is a diagrammatic view, partially sectional, showing one form of apparatus embodying my invention. Fig. 2 is a diagrammatic view showing apparatus embodying my invention when applied to the control circuits of an electroresponsive device.

Referring to Fig. 2, the reference character L designates as a whole a light sensitive unit for controlling an electroresponsive device, here shown as a relay R. The light responsive device of unit L may take any one of the suitable forms well known to the art, and as here shown is a photo-electric cell which serves to govern a gridglow tube G having a grid element 1, an anode element 2 and a cathode element 3. The tube G is provided with an anode-cathode circuit by connecting one terminal of a secondary winding 6 of a transformer T with the anode 2 of tube G, and connecting the other terminal of secondary winding 6 through the operating winding of relay R with the cathode 3 of tube G, primary winding 7 of transformer T being constantly connected with a source of alternating current, such as a generator not shown. A biasing combination, consisting of a reactor 5 in series with a resistor 20, is connected across the terminals of secondary winding 6. A grid circuit for establishing a biasing electromotive force across the grid and anode of the tube is provided for tube G by connecting the grid 1 through a high resistance grid leak 4 with a selected point of the biasing combination, the connection preferably being established at a point intermediate the reactor 5 and the resistor 20. The values of the biasing combination and grid leak 4 are preferably so selected that the ionization of tube G is controlled to render the tube conductive to energize the relay R only in the event that grid 1 is connected with anode 2 through a low resistance medium. As here shown, the low resistance medium is the cell P, which is characterized by the fact that it has an extremely high resistance when not actuated by light rays, but that when actuated its resistance drops to a relatively small value. Preferably, the parts are so proportioned that relay R is energized by virtue of current flowing in the anode-cathode circuit only in the event that light of more than a predetermined density actuates cell P.

In order that the control of relay R may be responsive to the sensitive conditions required, it is necessary to have the circuit connecting the grid 1 with the biasing connection, and with the photo-electric cell P, very highly insulated from the remainder of the control circuits. I have found that moisture present in the atmosphere may influence the operating characteristics of the circuit if this hypersensitive portion is exposed to the atmosphere. In order to maintain unit L at its maximum point of sensitivity, I provide a container 8 which is preferably impervious to moisture, and into which the tube G and the cell P are sealed by any means, such as for example, sealing wax, so that their external contact terminals are entirely enclosed within container 8. The circuits interconnecting tube G, cell P and grid leak 4 are arranged and disposed within container 8. Container 8 is provided with external contact members 9 which connect with the circuits for tube G and cell P disposed within container 8. Moisture initially within container 8 is preferably removed by any suitable means, such as by the introduction of a moisture extracting element within container 8.

Referring now to Fig. 1, a receptacle 10 provided with a suitable form of a moisture extracting element is shown provided for container 8 of unit L. The moisture extracting element of receptacle 10 may be any one of several types well known to the art, and preferably, the element is of the type characterized by the ability to display its moisture extracting capacity, or percentage of saturation with moisture, such as, for example, an indicating grade of a coagulation of a colloidal solution of silicic acid, commonly known as silica gel. I prefer to introduce receptacle 10 into container 8 of unit L so that the moisture extracting element is exposed to the atmosphere of container 8, and to seal receptacle 10 into container 8 by any suitable sealing means. To best utilize my invention, receptacle 10 for the moisture extracting element is preferably of glass or other suitable material capable of permitting the indication of the extracting element to be visible. It is to be seen, therefore, that the moisture extracting element will continue to adsorb any moisture leaking into container 8 so as to maintain the circuits disposed within container 8 in a state of continuous dry atmosphere with the result that the operating characteristics of unit L are unaffected by atmospheric moisture. When the moisture extracting element reaches its saturation point so that it no longer functions to adsorb moisture, this condition is indicated by the element, and the element may be removed from container 8 and replaced with an unsaturated element.

Referring once more to Fig. 1, the reference character 11 designates an outer envelope or housing for unit L, which housing is preferably opaque. Housing 11 is provided with an aperture through which light may be introduced to actuate unit L. Disposed within the aperture of housing 11 is any suitable optical means, such as, for example, converging lens 12 for focusing the light rays 13 entering housing 11 from the source of light, not shown on the drawing for simplicity, at a fixed point within the housing. Preferably, a plain lens 14 is disposed within the aperture for housing 11 outside converging lens 12 and separated from converging lens 12 by an air space. Suitably disposed within the defined air space between lens 12 and lens 14 is a heating element 15, preferably a resistor, and which element when energized maintains the defined air space at a temperature effective to prevent the formation of moisture and frost upon lens 12 and lens 14. It is to be seen, therefore, that light entering housing 11 is not obstructed by frost or moisture formation upon the lenses, so that the lenses are capable at all times of admitting the full amount of light received from the source.

Housing 11 is preferably provided with a fixed supporting member or base plate 16 which is provided with contact members 17 cooperating with contact members 9 of container 8.

In order to assure that cell P responds only to light rays emitted from the selected source of light, I provide an opaque screen 18 having an aperture which is so disposed that only light rays from the selected source, entering housing 11 through converging lens 12, passes through the aperture in screen 18. Preferably, screen 18 is so located that its aperture coincides with, and includes, the focal point of lens 12. Unit L is located behind screen 18 and is positioned and supported by the interaction of contact members 9 of container 8 and contact members 17 of member 16 so that the maximum actuation of cell P is obtained by light passing through lens 12 and the aperture of screen 18. I also provide cell P with an opaque outer covering, which covering is preferably black enamel or other opaque substance deposited on the outer surface of the envelope for cell P. A window portion, that is, a portion free from the opaque covering, is provided for cell P so that light passing through the aperture in screen 18 may actuate the cell. It is apparent that cell P may be actuated only by light rays entering housing 11 through lens 12 with the result that an inspection door 19 in housing 11, usually located in the housing on the side opposite the side containing lens 12, may be opened for permitting inspection of control elements within housing 11 without interfering with the operation of unit L.

In order to permit testing of the light sensitive device as a unit, and to permit unit L to be removed and replaced by another unit of like character, I provide contact members 9 of light sensitive unit L with plug-in characteristics of the well-known form. It follows that since contact members 17 of supporting member 16 cooperate with contact members 9, unit L may be readily removed from housing 11, and another light sensitive unit of like character replaced in housing 11 at the point at which maximum actuation of cell P is obtained. The light sensitive device removed from housing 11 may then be tested as a unit.

One advantage of apparatus embodying my invention is the provision of novel and improved means whereby the operation of light sensitive devices may be improved.

Although I have herein shown and described only one form of apparatus embodying my invention, it is understood that various changes and modifications may be made therein within the scope of the appended claim without departing from the spirit and scope of my invention.

Having thus described my invention, what I claim is:

In combination, an outer opaque envelope provided with an optical system for admitting a beam of light, a light-sensitive cell having an opaque covering provided with an aperture, a moisture-proof container for supporting said cell with its aperture disposed in the path of said beam of light, circuit elements sensitive to the presence of moisture disposed within said container and controlled by said cell, detachable plug-in type contact elements provided on said container and connected with said circuit elements for cooperatively engaging mating contact elements provided in said envelope whereby to position said container in said envelope and to permit electrical contact to be established with said circuit elements, and moisture extracting means of the type capable of displaying its moisture extracting capacity disposed in said container for maintaining said circuit elements in a continuously dry condition.

JOHN W. LOGAN, Jr.